(No Model.)
A. J. KERN.
CULTIVATOR.
No. 393,244. Patented Nov. 20, 1888.
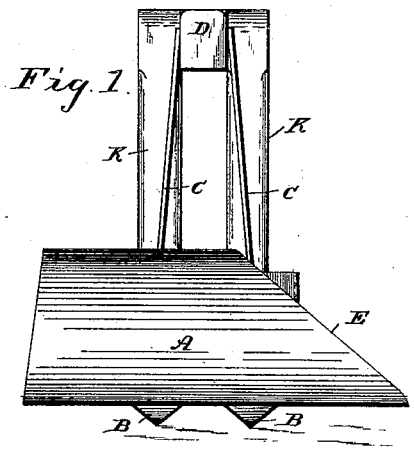
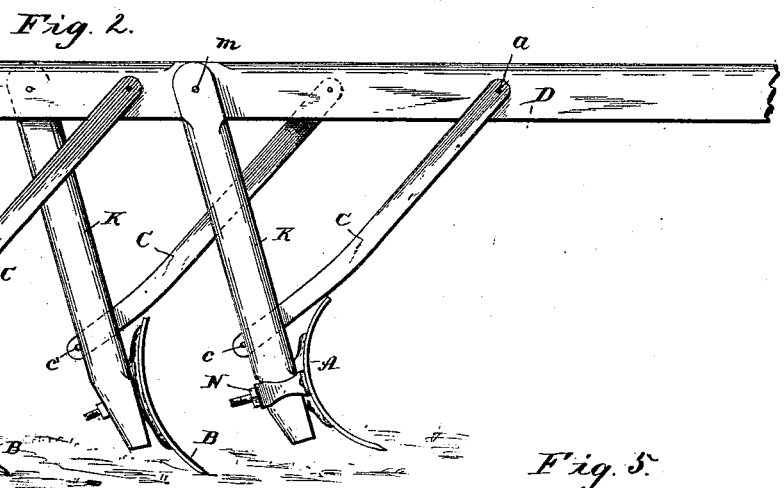
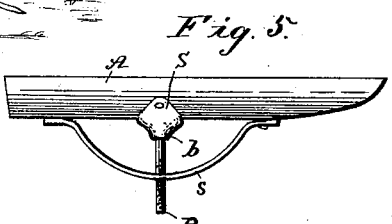
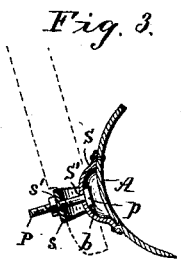
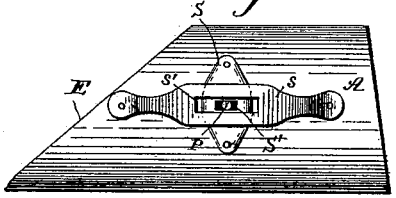
Witnesses.
Edwin L. Bradford.
Frank Dorian.
Inventor,
Amiah J. Kern.
By his Attorney in fact
Charles E. Barber.

UNITED STATES PATENT OFFICE.

AMIAH J. KERN, OF BELLEVUE, OHIO.

CULTIVATOR.

SPECIFICATION forming part of Letters Patent No. 393,244, dated November 20, 1888.

Application filed June 29, 1888. Serial No. 278,523. (No model.)

*To all whom it may concern:*

Be it known that I, AMIAH J. KERN, a citizen of the United States, residing at Bellevue, in the county of Huron, State of Ohio, have invented certain new and useful Improvements in Cultivators, of which the following is so full, clear, and exact a description as will enable others skilled in the art to which my invention appertains to make and use the same, reference being had to the accompanying drawings, in which—

Figure 1 is a front view of one of the beams of a cultivator embodying my invention. Fig. 2 is a side view of the same. Fig. 3 is a vertical section of my improved shovel, taken in the direction of the movement of the cultivator. Fig. 4 is a back view of my improved shovel with the fastening pin and nut removed. Fig. 5 is a top view of my improved shovel with the attachment-pin inserted in its socket.

The object of my invention is to construct a cultivator which shall effectually agitate and pulverize the soil between the rows without injuring the growing grain or vegetable.

Another object of my invention is to construct a cultivator which can be so adjusted as to enable the operator to throw the dirt up against the hills or rows of grain, or to throw it away from said hills, or to simply agitate the dirt and cut off wheat without throwing the dirt in either direction.

Another object of my invention is to produce an improved means of adjusting the angle of the shovel.

Another object of my invention is to construct an adjusting mechanism which may be readily and easily operated at will in the shortest possible time and with the least expense of physical force.

Another object of my invention is to provide a socket-and-pin attachment in which the inside of the socket is so recessed as to secure the practical immobility of the head of the attaching-pin in the socket and the shovel against becoming accidentally released while the cultivator is being adjusted or while it is being operated.

To these ends my invention consists in novel construction, combination, and arrangement of parts, as will be hereinafter fully explained in connection with the accompanying drawings, in which—

A designates my improved shovel, which is attached in front of a series of ordinary pointed shovels, B, and is attached to the pivoted knee K by means of the pin-and-socket attachment hereinafter described. The knees of the various shovels are pivoted at the main beam, and the knee of the forward shovel being designated by *m*. This knee is prevented from swinging backward during operation of the cultivator by means of the retaining-strap C, which projects through a perforation in the knee, and upon which the knee is guided in the pivotal adjustment backward and forward. The strap C is provided with a stop, *c*, at its lower outer extremity, and is pivotally secured at *a* to the beam D. The shovel A is of cylindrical shape, the lower edge being sharpened and retreating from the line at right angles to the motion of the cultivator when secured in its central position, and its upper edge being beveled at one side, as shown at E.

The socket-and-pin attachment above referred to, which constitute the attaching and adjusting mechanism, are constructed as follows: A boss or socket, S, is secured to the rear of the shovel A, and is provided with a slot, S', which extends longitudinally with the shovel and at right angles to the line of the forward movement of the cultivator. Each side of the slot S' is provided with an internal recess, *b*, which is adapted to receive the T-shaped head of the bolt or pin P. It will be observed that the head *p* of the pin P projects slightly beyond the line of the main portion of the pin at two opposite sides, and it is obvious from such construction that by inserting the head *p* within the recess S' of the socket or clip S and giving the pin P a quarter of a rotation the projecting ends of the head *p* will rest snugly within the recesses *b b*, and the pin which is extended through the lower portion of the knee K is in position to receive a nut, N, on the rear side of the knee K.

A guide-strap, *s*, is secured to the rear of the shovel A, and is curved up and around in such a position as to partially encircle the knee K. This strap *s* is provided with a slot, *s'*, through which the bolt or pin P extends, and in which slot it is free to play when the nut N is unscrewed sufficient to release its tension on the head $p$ of the bolt P and the friction against the outer portion of the strap $s$.

From the foregoing it will be readily understood that the shovel may be adjusted at any desired angle, and the dirt may be pulverized and thrown up toward or away from a row at will.

Having now described the objects, uses, and advantages of my device, what I believe to be new, and desire to secure by Letters Patent of the United States, and what I therefore claim, is—

1. In a cultivator, a shovel to the back of which is fastened a socket, S, and a guide-strap, $s$, both provided with a slot in the direction of the length of the shovel, the strap clasping the end of the knee, in combination with a pin, P, screw-threaded and provided with a head elongated in one direction, which head is inserted into the socket S, while the shank of the pin extends through the end of the knee and the slot in the guide-strap, and a nut playing on the screw-thread of said pin, substantially as and for the purposes specified.

2. In a cultivator, a socket fastened to the back of the shovel, said socket provided with a slot, which slot is provided with an internal recess, $b$, above and below it, in combination with a screw-threaded pin provided with a head elongated in one direction, said head being insertible into the slot in the socket, and being confined by said recesses above and below said slot on being turned to a quarter-revolution, substantially as described.

In testimony whereof I affix my signature in the presence of two witnesses.

AMIAH J. KERN.

Witnesses:
A. R. SHIPMAN,
R. H. BOYER.